United States Patent
Zheng et al.

(10) Patent No.: US 9,444,364 B2
(45) Date of Patent: *Sep. 13, 2016

(54) ADAPTIVE PEAK POWER CONTROL

(71) Applicant: Dialog Semiconductor Inc., Campbell, CA (US)

(72) Inventors: Junjie Zheng, Santa Clara, CA (US); Liang Yan, Milpitas, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 14/217,413

(22) Filed: Mar. 17, 2014

(65) Prior Publication Data

US 2014/0268913 A1     Sep. 18, 2014

Related U.S. Application Data

(60) Provisional application No. 61/801,190, filed on Mar. 15, 2013.

(51) Int. Cl.
*H02M 3/335*  (2006.01)
*H02M 7/217*  (2006.01)
*H02M 3/156*  (2006.01)

(52) U.S. Cl.
CPC ....... *H02M 7/2176* (2013.01); *H02M 3/33507* (2013.01); *H02M 2003/1566* (2013.01)

(58) Field of Classification Search
CPC .............. H02M 3/33538; H02M 3/33546; H02M 3/33515; H02M 3/33576; H02M 3/33592; H02M 3/33553; H02M 3/33507; H02M 3/33523

USPC ............................................ 363/21.04–21.18
See application file for complete search history.

(56) References Cited

U.S. PATENT DOCUMENTS

| 7,492,619 | B2 * | 2/2009 | Ye | H02M 3/33507 323/225 |
| 8,018,743 | B2 * | 9/2011 | Wang | H02M 3/33507 323/284 |
| 8,094,468 | B2 | 1/2012 | Yang et al. | |

(Continued)

FOREIGN PATENT DOCUMENTS

| CN | 102097960 A | 6/2011 |
| JP | 2008-092712 A | 4/2008 |

(Continued)

OTHER PUBLICATIONS

Chinese First Office Action, Chinese Application No. 201310077474.1, Dec. 19, 2014, 8 pages (with concise explanation of relevance).

(Continued)

*Primary Examiner* — Jeffrey Gblende
(74) *Attorney, Agent, or Firm* — Fenwick & West LLP

(57) ABSTRACT

A switching power converter includes a controller configured to transition from a first operating mode to a second operating mode by determining the operating conditions at the transition point between the operation modes. The controller uses the value of the voltage-time product determined at the boundary between the first and second operating modes to predict the voltage to be applied to the primary-side of the transformer. Using the predicted voltage, the controller can adjust the peak-power control threshold on a cycle-by-cycle basis without the transformer reaching saturation.

12 Claims, 5 Drawing Sheets

(56) References Cited

U.S. PATENT DOCUMENTS

| | | |
|---|---|---|
| 2005/0073862 A1 | 4/2005 | Mednik et al. |
| 2008/0037293 A1 | 2/2008 | Jacques et al. |
| 2008/0049457 A1* | 2/2008 | Choi .................. H02M 1/44 363/21.12 |
| 2010/0165672 A1* | 7/2010 | Li ...................... H02M 3/33507 363/21.16 |
| 2010/0315838 A1 | 12/2010 | Mao et al. |
| 2011/0194315 A1* | 8/2011 | Gaknoki ........... H02M 3/33507 363/21.17 |
| 2012/0081084 A1 | 4/2012 | Yang et al. |
| 2013/0235621 A1 | 9/2013 | Yan et al. |

FOREIGN PATENT DOCUMENTS

| | | |
|---|---|---|
| KR | 10-2009-0132497 A | 7/2011 |
| KR | 10-2011-0098000 A | 8/2011 |
| TW | 201034353 A | 9/2010 |
| TW | 201108576 A | 3/2011 |
| TW | 201113531 A | 4/2011 |
| TW | 201115898 A | 5/2011 |

OTHER PUBLICATIONS

Korean Office Action, Korean Application No. Oct. 2013-0024681, Aug. 25, 2014, 7 pages.
Taiwan Office Action, Taiwan Application No. 102107919, Oct. 3, 2014, 10 pages.
Chinese Second Office Action, Chinese Application No. 201310077474.1, Aug. 31, 2015, 7 pages.

* cited by examiner

ADAPTIVE PEAK POWER CONTROL

CROSS REFERENCE TO RELATED APPLICATION

This application claims priority under 35 U.S.C. §119(e) from U.S. Provisional Patent Application No. 61/801,190, filed on Mar. 15, 2013, which is incorporated by reference herein in its entirety.

BACKGROUND

1. Technical Field

The present disclosure relates to controlling a switching power converter to adaptively adjust the output voltage of the power converter during peak power conditions.

2. Description of the Related Art

Power supply demands for electronic devices such as printers, audio devices, and network adapters often vary under different operating conditions. For example, the output power demands of a power converter for a printer may fluctuate in a range of 100% to 400% of the normal output power level. These fluctuations, however, may occur during a relatively short period of time compared to the overall operating period of the power converter. One solution to accommodate these brief power demand fluctuations includes adding design capacity to the power converter to accommodate the additional power supply capacity demands under all operating conditions. Other solutions include increasing the switching frequency of the power converter.

These solutions, like many other solutions for addressing fluctuating power supply demands for electronic devices have drawbacks. Designing for increased capacity often results in a larger and more expensive power converter. Increasing the switching frequency of the power converter increases the amount of undesirable electromagnetic and radio frequency interference (EMI and RFI) generated by the converter. Further, increasing the switching frequency reduces the overall efficiency of the power converter and also results in an undesirable increase in the heat generated by the power converter.

SUMMARY

Embodiments include a power regulation approach for transitioning from a first operating mode to a second operating mode by determining the operating conditions at the transition point between the operation modes. The controller uses the value of the voltage-time product determined at the boundary between the first operating mode and the second operating mode to predict the voltage to be applied to the primary-side of the transformer during a subsequent switching cycle. Using the predicted voltage, the controller can adjust the peak-power control threshold on a cycle-by-cycle basis without the transformer reaching saturation.

The features and advantages described in the specification are not all inclusive and, in particular, many additional features and advantages will be apparent to one of ordinary skill in the art in view of the drawings and specification. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present disclosure can be readily understood by considering the following detailed description in conjunction with the accompanying drawings.

DETAILED DESCRIPTION OF EMBODIMENTS

The Figures (FIG.) and the following description relate to preferred embodiments of the present disclosure by way of illustration only. It should be noted that from the following discussion, alternative embodiments of the structures and methods disclosed herein will be readily recognized as viable alternatives that may be employed without departing from the principles of the present disclosure.

Reference will now be made in detail to several embodiments of the present disclosure, examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the embodiments described herein.

Example Switching Power Converter Circuit

Figure 1:
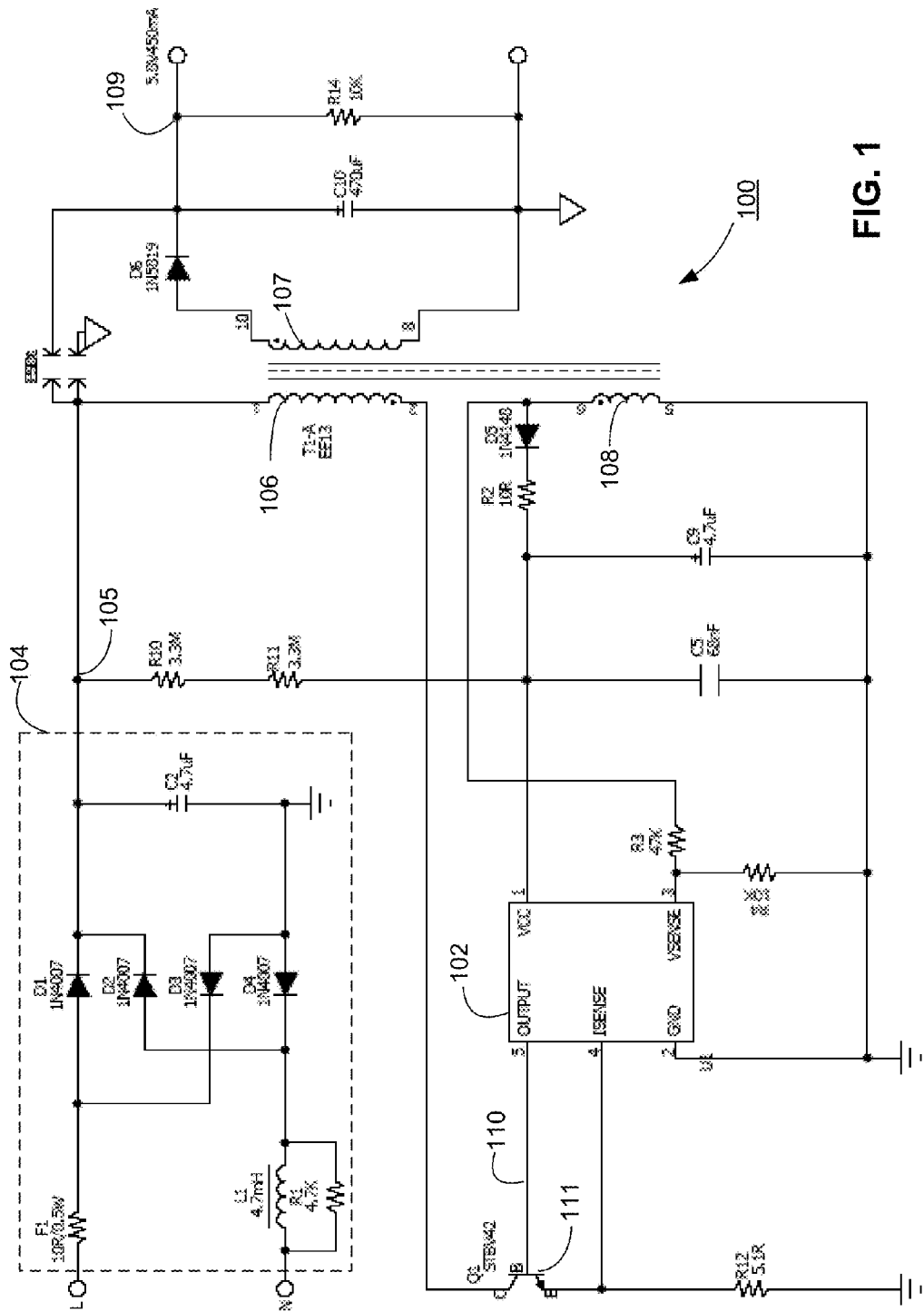
FIG. 1 is a circuit diagram illustrating a switching power converter, according to one embodiment.

FIG. 1 is a circuit diagram illustrating a switching power converter 100, according to one embodiment. The switching power converter 100 is a primary-side feedback flyback converter, and includes three principal sections, i.e., a front end 104, power stage, and a secondary stage. The front end 104 is connected to an AC voltage source (not shown) at nodes L, N, and includes a bridge rectifier comprised of inductor L1, resistors R1, F1, diodes D1, D2, D3, D4, and capacitor C2. The rectified input line voltage at node 105 is input to the supply voltage pin Vcc (pin 1) of the controller IC 102 via resistors R10 and R11. The line voltage at node 105 is also connected to the primary winding 106 of the power transformer T1-A. The capacitor C5 removes high frequency noise from the rectified line voltage. The output of the front end section at node 105 is an unregulated DC input voltage.

The power stage includes the power transformer T1-A, the switch 111, and the controller IC 102. The power transformer T1-A includes a primary winding 106, a secondary winding 107, and an auxiliary winding 108. The controller IC 102 maintains output regulation via control of the ON and OFF states of the switch 111. The ON and OFF states of the switch 111 are controlled via a control signal 110 output from the OUTPUT pin (pin 5) of the controller IC 102. The control signal 110 drives the base (B) of the switch 111. The collector (C) of the switch 111 is connected to the primary winding 106, while the emitter (E) of the switch 111 is connected to $I_{SENSE}$ pin (pin 4) of the controller IC 102 and to ground via the resistor R12. The $I_{SENSE}$ pin senses the current through the primary winding 106 and the switch 111 in the form of a voltage across sense resistor R12. The controller IC 102 employs the modulation technique (i.e., operation modes) as described below in detail with reference to FIG. 3 to control the ON and OFF states of the switch 111, the duty cycles of the switch 111, and the amplitude of the switch 111 base current in accordance with varying load conditions at node 109. The GND pin (pin 2) of the controller IC 102 is connected to ground. While a BJT switch Q1 is used as the switch 111 in the embodiment of FIG. 1, a power MOSFET may also be used as the switch 111 for the switching power converter 100 according to other embodiments herein.

The secondary stage includes a diode D6 functioning as an output rectifier and a capacitor C10 functioning as an output filter. The resulting regulated output voltage Vout at node 109 is delivered to the load (not shown) and a pre-load resistor R14. The pre-load resistor R14 stabilizes the output of the power converter at no load conditions. Also, an ESD (Electrostatic Discharge) gap (ESDI) is coupled between the primary winding 106 and the diode D6.

The output voltage Vout at node 109 is reflected across the auxiliary winding 108, which is input to the $V_{SENSE}$ pin (pin 3) of the controller IC 102 via a resistive voltage divider comprised of resistors R3 and R4. Also, although the controller IC 102 is powered up by the line voltage 105 at start-up, the controller IC 102 is powered up by the voltage across the auxiliary winding 108 after start-up and in normal operation. Thus, diode D5 and resistor R2 form a rectifier for rectifying the voltage across the auxiliary winding 108 for use as the supply voltage input to the $V_{CC}$ pin (pin 1) of the controller IC 102 after start-up during normal operation. The capacitor C9 is used to hold power from the line voltage at node 105 at start-up or from the voltage across the auxiliary winding 108 after start-up between switching cycles.

Figure 2A:
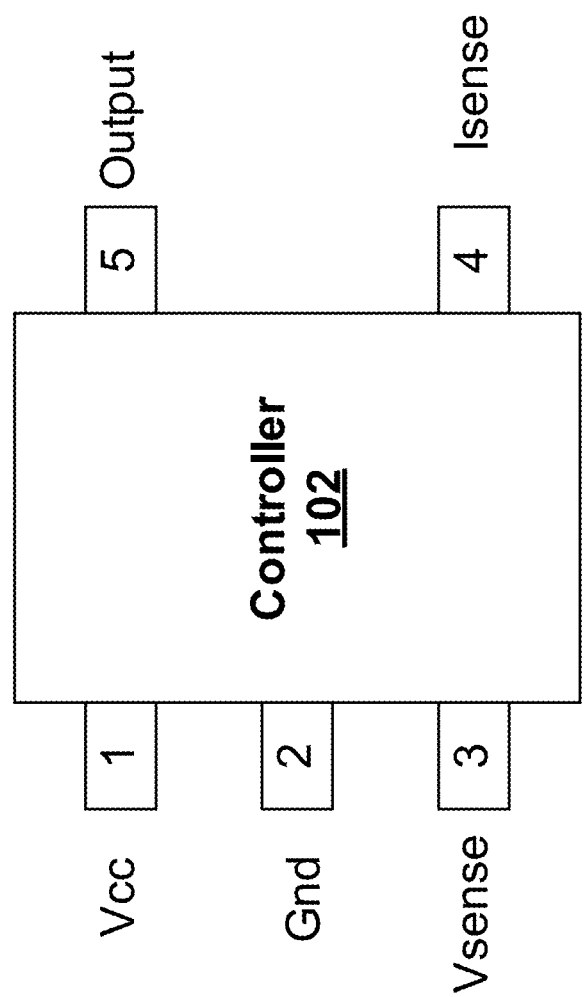
FIG. 2A is a diagram illustrating the pin-outs of the controller of the switching power converter of FIG. 1, according to one embodiment.

FIG. 2A is a diagram illustrating the pin-outs of the controller IC 102 of the switching power converter 100, according to one embodiment. The controller IC 102 is a 5-pin IC. Pin 1 (Vcc) is a power input pin for receiving the supply voltage, pin 2 (Gnd) is a ground pin, pin 3 ($V_{SENSE}$) is an analog input pin configured to receive the voltage across the auxiliary winding 108 of the switching power converter 100 for primary-side regulation of the output voltage Vout, and pin 4 ($I_{SENSE}$) is an analog input pin configured to sense the primary-side current of the flyback switching power converter in the form of an analog voltage, for cycle-by-cycle peak current control and limit. Pin 5 (Output) is an output pin outputting the control signal 110 for controlling the on-times and off-times of the switch 111 as well as the amplitude of the base current or gate current applied to the switch 111.

Figure 2B:
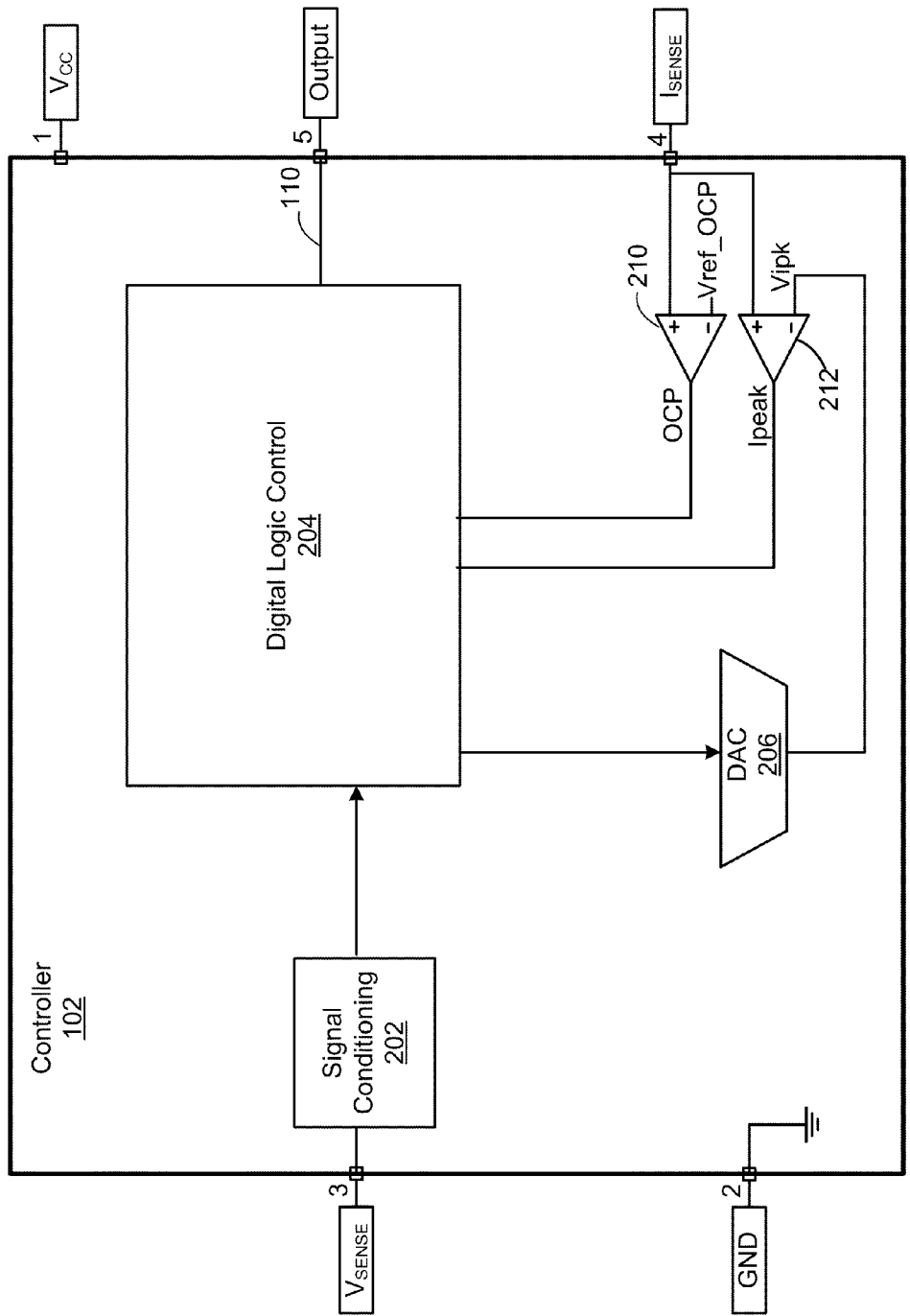
FIG. 2B is another view of the controller of FIG. 2A illustrating the internal circuitry of the controller of the switching power converter of FIG. 1 in more detail, according to one embodiment.

FIG. 2B is another view of the controller IC 102 illustrating the internal circuitry of the controller IC 102 of the switching power converter 100. The controller IC 102 receives analog parameters such as the $V_{SENSE}$ voltage at pin 3 and the $I_{SENSE}$ voltage at pin 4, but adaptively processes these parameters using digital circuitry and digital state machines to generate the appropriate control signal at 110 at pin 5 (Output). The controller IC 102 includes several main circuit blocks, including signal conditioning block 202, digital logic control 204, digital-to-analog converter (DAC) 206, Ipeak comparator 212, and over-current protection (OCP) comparator 210. The controller IC 102 regulates the output voltage Vout and output current Iout of the switching power converter 100 by means of adaptive digital, primary-side feedback control. Sensing the primary-side current at the $I_{SENSE}$ pin (pin 4) allows cycle-by-cycle peak current control and limit in both CV (Constant Voltage) and CC (Constant Current) modes as well as precise constant current (output current Iout) control that is insensitive to the magnetizing inductance Lm of the transformer T1-A. In particular, the controller IC 102 uses the sensed primary-side current to predict on a cycle-by-cycle basis a voltage to be applied to the primary-side winding to adjust the peak-power control threshold while the switching power converter is operating under peak power control mode. Sensing the output voltage Vout reflected across the auxiliary winding 108 at the $V_{SENSE}$ pin (pin 3) allows for precise output voltage regulation.

The digital-to-analog converter (DAC) 206 is configured to receive a digital signal derived from the sensed primary-side switching current and output an analog voltage used as a reference voltage associated with a voltage corresponding to the peak primary-side switching current threshold. The Ipeak comparator 212 compares the peak primary-side switching current threshold with a voltage signal corresponding to the primary-side switching current sensed at $I_{SENSE}$ pin (pin 4) to generate a feedback signal used for peak power control operation in CMM mode. The over-current protection (OCP) comparator 210 controls the maximum peak power. The OCP comparator 210 compares the voltage signal corresponding to the primary-side switching current sensed at $I_{SENSE}$ pin (pin 4) with a OCP reference voltage threshold. The OCP comparator 210 generates a logic high signal when the voltage signal corresponding to the primary-side switching current sensed at $I_{SENSE}$ pin (pin 4) is higher than the OCP reference voltage threshold.

Figure 3:
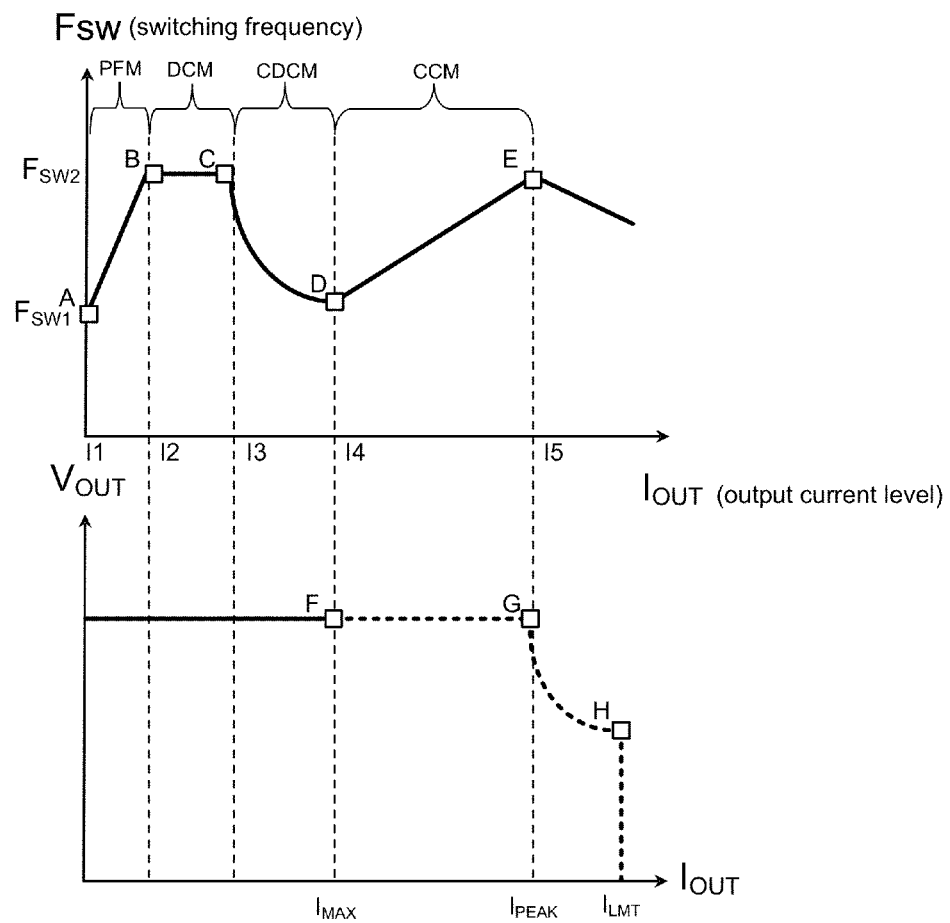
FIG. 3 is a graph illustrating the operation modes of a switching power converter of FIG. 1, according to one embodiment.

The controller IC 102 causes switching power converter 100 to operate in one of multiple operation modes depending on load conditions, as described below in detail with reference to FIG. 3. According to one embodiment as shown in FIG. 3, the controller IC 102 employs pulse frequency modulation (PFM), discontinuous conduction mode (DCM), critical discontinuous conduction mode (CDCM), and continuous conduction mode (CCM). In another embodiment, under CCM operation, the controller IC 102 further employs a peak power mode control. Under the peak power mode control, the controller IC 102 uses the value of the voltage-time product determined at the boundary of the CDCM and CCM operation to predict the voltage to be applied to the primary-side of the transformer to adjust the peak-power control threshold on a cycle-by-cycle basis. The voltage-time product represents the maximum amount of time that a transformer can have a constant voltage applied to it without the transformer reaching saturation.

Returning to FIG. 2B, the signal conditioning block 202 receives the $V_{SENSE}$ voltage and generates voltage and current feedback parameters for use by digital logic control block 204. In one example, generated voltage feedback parameters include the feedback voltage value $V_{FB}$ that represents the value of the $V_{SENSE}$ voltage sampled at the end of the transformer reset time in each switching cycle. In some cases, the feedback parameter $V_{FB}$ is scaled to a comparable level for comparison with a reference voltage $V_{REF}$. In one example, $V_{REF}$ is a digital value that represents the target regulated output voltage (e.g., 5V) of the switching power converter 100, scaled to a lower value (e.g., 1.538V) according to the turns ratio between the secondary winding 107 and the auxiliary winding 108 and the resistive voltage divider (R3/(R3+R4)). Thus, the specific value of the reference voltage $V_{REF}$ is determined according to the target regulated output voltage of the switching power converter 100. The generated current feedback signals include, among others, secondary current timing information such as Tp (switching period) and Trst (transformer reset time) output to the digital logic control block 204. The voltage feedback values and current feedback values, including $V_{FB}$, Tp, and Trst may be determined using one of a variety of conventional digital, analog, or combination of digital and analog techniques.

FIG. 3 is a graph illustrating the operation modes of a switching power converter 100 of FIG. 1, according to one embodiment. For example, as shown in FIG. 3, the controller IC 102 operates the switching power converter 100 in PFM operation under low load conditions between corresponding output current levels I1 and I2 (between operating points A and B). In this example, low load condition occurs when the voltage sensed by the $V_{SENSE}$ pin (pin 3) of the controller IC 102 satisfies a PFM threshold voltage $V_{TH\_PFM}$.

In one embodiment, the threshold voltages used by the controller IC 102 to determine when to transition to an operation mode are determined based on a percentage of regulation a voltage $V_{REG}$ derived from $V_{SENSE}$. For example, the PFM threshold voltage $V_{TH\_PFM}$ may be set to a value between 0% and 10% of $V_{REG}$, and the threshold for PFM to DCM could be set to a value between 10% and 50% of $V_{REG}$. Other thresholds may also be used without departing from the scope of the disclosure such that the threshold voltage from PFM to DCM is less than the threshold voltage from DCM to CDCM.

The PFM threshold voltage $V_{TH\_PFM}$ occurs when the peak primary-side current is less than the value of $V_{TH\_PFM}$ divided by the value of the sense resistor R12. In PFM operation mode, the duty cycle of the switch 111 is varied by keeping the conduction pulse width of the control signal 110 constant, while varying the switching period and thus the switching frequency. For example, in PFM operation, a switch may be turned on for 5 μs of each switching period, but the switching frequency may be varied between 40 kHz ($F_{SW1}$) and 130 kHz ($F_{SW2}$). A switching frequency of 40 kHz corresponds to a switching period of 25 μs, and therefore, the duty cycle at this switching frequency is 20% (=5 μs/25 μs). For a switching frequency of 130 kHz, the switching period is 7.7 μs, and therefore, the duty cycle at 130 kHz is 65% (=5 μs/7.7 μs).

In PFM operation, the controller IC 102 regulates the output voltage by varying the switching period of the control signal 110, while keeping the pulse conduction width ($T_{ON}$) of the control signal 110 constant. As the regulation decreases (i.e., the load decrease), the controller IC 102 increases the switching period to reduce the output voltage. Increasing the switching period of the switch 111 causes less energy to be transferred per unit of time (i.e., reduces the duty cycle) to the primary winding 106 of the power transformer T1-A, which in turn decreases the output voltage of the switching converter 100. Conversely, as the regulation increases (i.e., the load increases), the controller IC 102 decreases the switching period to increase the output voltage of the switching converter 100. Decreasing the switching period of the switch 111 transfers more energy per unit of time to the primary winding 106 of the power transformer T1-A (i.e., increases the duty cycle), which in turn increases the output voltage of the switching converter power 100.

In one embodiment, the controller IC 102 may employ a regulation scheme for transitioning from a first operating mode to a second operating mode by determining the operating conditions at the transition point using a point where the switch 111 would have been turned on if operating under the first operating mode as a reference point to determine when to turn on the switch under the second operating mode. In particular, the controller IC 102 uses the reference point to determine a control period for regulating the switching period of the switch 111 in a second operating mode as described in U.S. patent application Ser. No. 13/772,202, filed Feb. 20, 2013, which is incorporated by reference in its entirety.

The controller IC 102 operates the switching power converter 100 in DCM operation under low load conditions between corresponding output current levels I2 and 13 (between operating points B and C). In this example, low load condition occurs when the voltage sensed by the $V_{SENSE}$ pin (pin 3) of the controller IC 102 is greater than the PFM threshold voltage $V_{TH\_PFM}$ but less than the DCM threshold voltage $V_{TH\_DCM}$. In DCM operation, the controller IC 102 controls switching of the switch 111 such that the magnetizing current stored in the power transformer T1-A drops to zero between switching cycles, and the current flowing through the diode D6 has completely dropped to zero before the switch 111 is turned ON.

In DCM operation, the controller IC 102 may regulate the switching of the switch 111 using pulse width modulation (PWM) operation mode. In PWM the duty cycle of the switch 111 is varied by adjusting how long the switch 111 remains ON (i.e., the conduction pulse width) during each switching period, i.e., using the on-time of the switch 111 as the control variable, while the switching period remains constant. For example, in PWM operation mode, the switch 111 may be turned ON at a switching frequency of 100 kHz (and therefore has a switching period of 10 μs). For a duty cycle of 30%, the switch 111 is controlled to be ON for 3 μs and OFF for 7 μs of each switching period.

In PWM operation mode, controller IC 102 regulates the output voltage of the switching power converter 100 by varying the conduction pulse width of control signal 110 (and thus the on-time of the switch), while keeping the switching period (equal to the inverse of the switching frequency). As the regulation decreases (i.e., the load decrease), the controller IC 102 reduces the conduction pulse width from to reduce the output voltage. Decreasing the conduction pulse width applied to the switch 111 causes less energy to be transferred per switching cycle to the primary winding 106 of power transformer T1-A, which in turn decreases the output voltage of the switching power converter 100. Conversely, as the regulation increases (i.e., the load increases), the controller IC 102 increases the conduction pulse width applied to the switch 111 to increase the output voltage of the switching power converter 100. Increasing the conduction pulse width of the switch 111 transfers more energy per cycle to the primary winding 106 of power transformer T1-A, which in turn increases the output voltage of the switching power converter 100.

The controller IC 102 operates the switching power converter 100 in CDCM operation under load conditions between corresponding output current levels 13 and 14 (between operating points C and D). In this example, the controller IC 102 transitions from DCM operation to CDCM operation when the controller IC 102 detects a zero voltage switching condition and the voltage sensed by the $V_{SENSE}$ pin (pin 3) of the controller IC 102 is greater than the DCM threshold voltage $V_{TH\_DCM}$ but greater than the reference voltage $V_{TH\_PK}$, which corresponds to the peak primary-side switching current. The zero voltage condition occurs when the voltage across the switch 111 reaches a local minimum value referred to as a valley. In one embodiment, the controller IC 102 may include a valley detection circuit to detect features of $V_{SENSE}$ or other feedback signals. In operation, the controller IC 102 operates in real time to detect and predict the occurrence of valleys on a switching-cycle by switching-cycle basis as described in U.S. patent application Ser. No. 12/642,261, which is incorporated by reference in its entirety. In one embodiment, the valley detection circuit is included in the signal conditional circuit 202 and provides information about the detected features of $V_{SENSE}$ to the digital logic control block 204 for further processing.

In CDCM operation, the controller IC 102 controls the switching of the switch 111, where when the switch 111 is turned ON is determined by zero voltage switching (ZVS), and when the switch 111 is turned OFF is determined by peak current switching. Peak current switching means that the switch 111 will be kept ON until the controller IC 102 detects a peak primary current based on $V_{SENSE}$. Zero voltage switching means that the switch 111 will be kept OFF until the reflected voltage detected at $V_{SENSE}$ pin (pin 3) falls to zero, at which point the switch 111 is turned ON.

For example, in CDCM operation, the controller IC 102 may employ a valley mode switching (VMS) operation mode, where the duty cycle of the switch 111 is varied by adjusting both the conduction pulse width and switching period of the control signal 110. Specifically, in VMS operation mode, the conduction pulse width is varied in accordance with PWM, PFM, or other suitable converter control schemes (i.e., operation modes). The switching period is not predetermined, but instead varies, because the switch is turned on at a valley (local minimum) of $V_{SENSE}$ signal that occurs immediately subsequent or otherwise subsequent to the desired switch turn on time as calculated by the employed operation mode (PWM or PFM). As previously discussed in conjunction with FIG. 2B, the signal $V_{SENSE}$ represents the output voltage Vout at node 109 as reflected across the auxiliary winding 108. Accordingly, the VMS operation mode and associated techniques described herein can benefit the switching power converter 100 that uses any control scheme, regardless of whether PWM or PFM or some other operation mode is used.

At the boundary between the CDCM operation and CCM operation, the controller IC 102 determines the voltage-time product of the transformer prior to transitioning to the CCM operation, and uses the determined voltage-time product as a reference point to determine a turn-on time of the switch 111 during the CCM operation. As previously described, the voltage-time product represents the maximum amount of time that a transformer can have a constant voltage applied to it without the transformer reaching saturation. At the boundary between CDCM and CCM operation corresponding output current level 14 and operation point D, the controller IC 102 is operating in peak-power control mode and the voltage-time product is a constant that depends on the value of magnetizing inductance Lm of the transformer T1-A and the value of sense resistor R12. That is, the value of the constant associated with the voltage-time product at the boundary between CDCM and CCM operation is user specified resulting from the selection of components. When transitioning from CDCM to CCM operation, at operating point D, the controller IC 102 registers or stores the value of the voltage-time product at the operating point D, which serves as a reference point to calculate, during a present switching cycle, a voltage level applied to the transformer during subsequent switching cycle under CCM mode to adjust the peak-power control threshold.

During CCM operation, the controller IC 102 operates in peak-power control mode. The peak load is defined by when the switching power converter 100 operates at operating point D, which may be 100% load, or 200% load, or greater. As shown in the output voltage $V_{OUT}$ versus output current $I_{OUT}$ graph, at operating point F, which coincides with operating point D, the switching power converter 100 delivers maximum current $I_{MAX}$ to the load. The peak load may be user-specified. During CCM operation, the controller IC 102 regulates the switching of the switch 111 in accordance with equations (1) and (2) as follows:

$$t_{ON} = \frac{(\text{volt} - \text{sec})\text{const}}{V_{in}} \quad (1)$$

$$t_{OFF} = \text{Variable} \quad (2)$$

where $t_{ON}$ represents the conduction pulse duration of the switching signal 110 applied to the switch 111 during a switching cycle, (volt-sec) represents the voltage-time product, $V_{in}$ represents the voltage applied to the primary side of the transformer T1-A, and $t_{OFF}$ represents the duration that the switch 111 is not conducting during a switching cycle. The off-time will be regulated by the internal digital control loop within the controller IC 102. For example, if the output voltage of the switching power converter 100 Vout is lower than the target voltage, the off-time will be reduced, if Vout is higher than the target voltage, the off-time will be increased. The on-time or conduction pulse width applied to the switch 111 during CCM is calculated on a switching-cycle by switching-cycle basis derived from the equation (1). The (volt-sec) during the CCM operation remains constant and maintains the same value registered from the boundary between CDCM and CCM.

Accordingly, in CCM operation, for each switching cycle, the initial primary-side switching current may be high. Given the same $V_{in}*t_{ON}$ (i.e., voltage-time product) applied to the transformer T1-A, the delta current increase is fixed. However, because the initial primary-side switching current may be relatively high compared to the current levels in PFM, DCM, and CDCM operation, the "ending" primary-side switching current during CCM operation may also be relatively high. For example, in CCM operation the controller IC 102 does not wait for the transformer reset to initiate the next cycle. Thus, in CCM operation the initial current is not zero. Instead, the increased switching current based on $V_{in}*t_{ON}$ is in addition to the initial non-zero current, resulting in a higher ending current. By employing this CCM method, the controller IC 102 causes the transformer T1-A to output energy that is significantly higher than normal DCM or CDCM operation.

In an embodiment, the controller IC 102 operates in over current protection mode while operating in CCM operation. For example, the controller IC 102 will enter OCP operation if the voltage sensed by the $V_{SENSE}$ pin (pin 3) of the controller IC 102 is greater than or equal to the OCP reference threshold value $V_{REF\_OCP}$. In OCP operation, the on-time and off-time will be limited. OCP operation is designed to prevent the primary current from becoming too high, which might damage the switching power converter 100 or other components. When the controller IC 102 detects that the primary current reaches a level to trigger OCP threshold, the switch 111 will be turned off. As shown in the output voltage $V_{OUT}$ versus output current $I_{OUT}$ graph of FIG. 3, the curve between the operating points G and H corresponds to the controller IC 102 operating in OCP mode. Also, during OCP operation, the controller IC 102 will disable the switching signal 110 if the OCP condition is satisfied for a specified number (e.g., seven) of consecutive switching cycles. For example, as shown in the output voltage $V_{OUT}$ versus output current $I_{OUT}$ graph of FIG. 3, the controller IC 102 disables the switching signal 110 at operating point H, which corresponds to when the primary switching current reaches the level represented as $I_{LMT}$.

Figure 4:
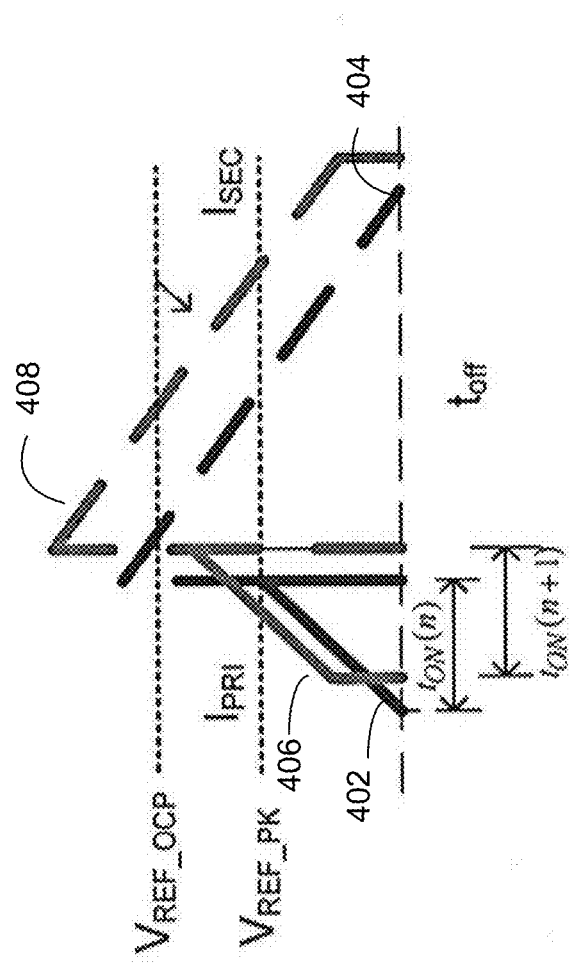
FIG. 4 illustrates operational waveforms of the switching power converter of FIG. 1 in a peak power operating mode, according to one embodiment.

FIG. 4 illustrates operational waveforms of the switching power converter of FIG. 1 in a peak power operating mode, according to one embodiment. For example, FIG. 4 shows an operational waveform of the primary-side switching current and the secondary-side switching current during two consecution switching cycles, n and n+1, respectively. In FIG. 4, the switching cycle n occurs at the boundary between CDCM and CCM, and the switching cycle n+1 occurs in a switching cycle occurring subsequent to switching cycle n. The waveform 402 represents the primary-side switching current for the switching cycle n, having a conduction pulse width $t_{ON}$. The waveform 402 increases relatively linearly from an initial value until reaching the voltage threshold $V_{REF\_PK}$ that corresponds to the peak primary-side switching current. At the point when the waveform 402 reaches the threshold $V_{REF\_PK}$, the conduction pulse width $t_{ON}$ ends, indicating the switch 111 transitioned from closed to open (i.e., ON to OFF). At the point when the waveform 402 reaches the threshold $V_{REF\_PK}$, the waveform 402 increases until reaching a OCP threshold $V_{REF\_OCP}$, after which the primary-side switching current decreases to its initial value at the beginning of the switching cycle n. The waveform 404 corresponds to the secondary-side switching current during the portion of the switching cycle n where the switch 111 is not conducting, represented as $t_{OFF}$.

The waveform 406 represents the primary-side switching current for the switching cycle n+1, having a conduction pulse width $t_{ON+1}$. As previously, described with reference to FIG. 3, the conduction pulse duration at the boundary between the CDCM and CCM operation is the same as the same as conduction pulse width during CCM operation. Accordingly, conduction pulse width $t_{ON+1}$ is the same as the conduction pulse width $t_{ON}$. The waveform 406 increases relatively linearly from an initial value until the end of the conduction pulse width $t_{ON+1}$, at which point, the primary switching current is greater than the threshold $V_{REF\_PK}$ but less than OCP threshold $V_{REF\_OCP}$. At the point when the waveform 406 reaches the end of conduction pulse width $t_{ON+1}$, the waveform 406 increases beyond the OCP threshold $V_{REF\_OCP}$, after which the primary-side switching current decreases to its initial value at the beginning of the switching cycle n+1. The switching current during the switching cycle n+1 is determined based at least in part on the value of $t_{ON}$ from the switching cycle n (i.e., previous operation mode) and is limited by whether an OCP condition is detected by the controller IC 102. That is, if the controller IC 102 detects and OCP condition, the value of $t_{ON+1}$ will be shorter than the value of $t_{ON}$ to prevent the switching current from exceeding a specified OCP level. The waveform 408 corresponds to the secondary-side switching current during the portion of the switching cycle n+1 where the switch 111 is not conducting, represented as $t_{OFF}$.

Upon reading this disclosure, those of skill in the art will appreciate still additional alternative designs for switching power converters. For example, although the controller IC 102 and its application circuit shown in FIG. 1 are based on the primary-side feedback control of flyback converters, the same principles of this disclosure are also applicable to alternative designs based on the secondary-side feedback control. Similar principles can be used with boost type switching power converters or switching power converters with other topologies. Thus, while particular embodiments and applications of the present disclosure have been illustrated and described, it is to be understood that the disclosure is not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the present disclosure.

What is claimed is:

1. A switching power converter comprising:
a transformer including a primary winding coupled to an input voltage and a secondary winding coupled to an output of the switching power converter;
a switch coupled to the primary winding of the transformer, current through the primary winding being generated while the switch is turned on and not being generated while the switch is turned off; and
a controller configured to generate a control signal to turn on or turn off the switch, the switch being turned on responsive to the control signal being in a first state and the switch being turned off responsive to the control signal being in a second state, wherein:
responsive to an occurrence of a local minimum of a voltage across the switch and a current level at the output of the switching power converter being greater than a first current level but less than a second current level, the second current level being greater than the first current level, the controller is further configured to generate the control signal based on a first operation mode;
responsive to satisfying a voltage-time product condition and a current at the output of the switching power converter being greater than the second current level but less than a third current level, the third current level being greater than the second current level, the controller is further configured to generate the control signal based on a second operation mode; and
wherein at a transition point between the first operation mode and the second operation mode, the controller is further configured to use a voltage-time product of the transformer prior to transitioning to the second operation mode as a reference point to determine a turn-on time of the switch during the second operation mode.

2. The switching power converter of claim 1, wherein under the second operation mode, the controller is further configured to calculate during a present switching cycle an adjustment to a peak-power control threshold during a subsequent switching cycle using the voltage-time product, the peak-power control threshold being a function of the voltage-time product and a voltage level applied to the transformer.

3. The switching power converter of claim 2, wherein the controller is further configured to adjust, on a switching cycle-by-switching cycle basis, a peak-power control threshold using the voltage-time product by calculating during a present switching cycle a voltage level adjustment to be applied to the transformer during a subsequent switching cycle.

4. The switching converter of claim 1, wherein the first operation mode is a pulse frequency modulation (PFM) operation mode.

5. The switching converter of claim 1, wherein the voltage-time product is a constant value.

6. The switching converter of claim 5, wherein the constant value is based at least in part on a magnetizing inductance of the transformer.

7. A method of controlling a switching power converter, the switching power converter including a transformer with a primary winding coupled to an input voltage and a secondary winding coupled to an output of the switching power converter, and a switch coupled to the primary winding of the transformer, current in the primary winding being generated while the switch is turned on and not being generated while the switch is turned off, the method comprising:

generating a control signal to turn on or turn off the switch, the switch being turned on responsive to the control signal being in a first state and the switch being turned off responsive to the control signal being in a second state, wherein:

responsive to an occurrence of a local minimum of a voltage across the switch and a current level at the output of the switching power converter being greater than a first current level but less than a second current level, the second current level being greater than the first current level, generating the control signal based on a first operation mode;

responsive to satisfying a voltage-time product condition and a current at the output of the switching power converter being greater than the second current level but less than a third current level, the third current level being greater than the second current level, generating the control signal based on a second operation mode; and wherein at a transition point between the first operation mode and the second operation mode, using a voltage-time product of the transformer prior to transitioning to the second operation mode as a reference point to determine a turn-on time of the switch during the second operation mode.

8. The method of claim 7, wherein under the second operation mode, calculating during a present switching cycle an adjustment to a peak-power control threshold during a subsequent switching cycle using the voltage-time product, the peak-power control threshold being a function of the voltage-time product and a voltage level applied to the transformer.

9. The method of claim 7, further comprising adjusting, on a switching cycle-by-switching cycle basis, a peak-power control threshold using the voltage-time product by calculating during a present switching cycle a voltage level adjustment to be applied to the transformer during a subsequent switching cycle.

10. The method of claim 7, wherein the first operation mode is a pulse frequency modulation (PFM) operation mode.

11. The method of claim 7, wherein the voltage-time product is a constant value.

12. The method of claim 11, wherein the constant value is based at least in part on the magnetizing inductance of the transformer.

* * * * *